United States Patent [19]

Fredette

[11] Patent Number: 4,465,658

[45] Date of Patent: Aug. 14, 1984

[54] CHLORINE DIOXIDE PROCESS

[75] Inventor: Maurice C. J. Fredette, Mississauga, Canada

[73] Assignee: Erco Industries Limited, Islington, Canada

[21] Appl. No.: 503,786

[22] Filed: Jun. 13, 1983

[51] Int. Cl.³ .............................................. C01B 11/02
[52] U.S. Cl. .................................... 423/478; 423/479; 423/520; 423/551
[58] Field of Search ............... 423/478, 479, 551, 520

[56] References Cited

U.S. PATENT DOCUMENTS

| 2,881,052 | 4/1959  | Julien et al.     | 422/189 |
|-----------|---------|-------------------|---------|
| 2,883,624 | 5/1958  | Sprauer           | 423/478 |
| 2,936,219 | 5/1960  | Rapson            | 423/478 |
| 3,789,108 | 1/1974  | Rapson            | 423/478 |
| 4,081,520 | 3/1978  | Swindells et al.  | 423/478 |
| 4,105,751 | 8/1978  | Caillol           | 423/479 |
| 4,145,401 | 3/1979  | Swindells et al.  | 423/478 |
| 4,154,809 | 5/1979  | Swindells et al.  | 423/478 |
| 4,325,934 | 4/1982  | Swindells et al.  | 423/551 |
| 4,409,066 | 10/1983 | Reeve et al.      | 162/88  |

FOREIGN PATENT DOCUMENTS 46-40527 11/1971 Japan .................................. 423/478

Primary Examiner—John Doll
Assistant Examiner—Jackson Leeds
Attorney, Agent, or Firm—Sim & McBurney

[57] ABSTRACT

Chlorine dioxide is formed at high efficiency from a solution of acid sodium chlorate at high sulphuric acid normality in excess of 9 normal to which methanol is fed. The reaction medium is at its boiling point under a subatmospheric pressure. The incidence of white-outs is avoided by feeding chloride ions to the reaction medium, while the efficiency of chlorine dioxide production remains high.

13 Claims, No Drawings

CHLORINE DIOXIDE PROCESS

FIELD OF INVENTION

The present invention relates to the production of chlorine dioxide.

BACKGROUND OF THE INVENTION

It is known to produce chlorine dioxide by reduction of an acid aqueous sodium chlorate solution using methanol, as described in U.S. Pat. No. 2,881,052. The process, however, is quite slow, involves the handling of a large volume of liquid effluent and the efficiency of the process is quite low. More recently there issued U.S. Pat. No. 4,081,520, assigned to the assignee hereof, wherein the problems of the prior process were overcome by the use of a single vessel generator-evaporator-crystallizer. The latter process operates at high efficiency, produces no liquid effluent and has an acceptable production rate.

In the commercial implementation of the above-noted process, complete loss of chlorine dioxide production has been observed from time-to-time. This phenomenon is thought to arise from complete exhaustion of the trace quantities of chloride ions, which must be present for reaction to occur, as a result of some change in the process conditions of the reaction medium.

It is well known that all chlorine dioxide generating processes involving reaction with chlorate proceed in accordance with the reaction:

$$ClO_3^- + Cl^- + 2H^+ \rightarrow ClO_2 + \tfrac{1}{2}Cl_2 + H_2O$$

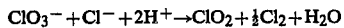

In the processes of U.S. Pat. Nos. 2,881,052 and 4,081,520, the chloride ions are formed in situ by reaction of methanol with the co-produced chlorine, so that significant quantities of chlorine do not result as a by-product and hence the chlorine dioxide contains little or no chlorine, depending on the overall efficiency of the process. If, for some reason, therefore, all the chloride ions are consumed by the above reaction, then production of chlorine dioxide will cease until chloride is produced by reduction of chlorate by methanol. This loss of chlorine dioxide production is termed a "white-out".

SUMMARY OF INVENTION

In accordance with the present invention, the problem of white-outs in the process of U.S. Pat. No. 4,081,520 is eliminated while the other useful attributes thereof, most significantly high efficiency, are retained, by the continuous addition of chloride ions to the reaction medium. By purposely adding chloride ions to the reaction medium, the presence of chloride ions at all times is ensured and hence the possibility of white-outs is eliminated.

The beneficial result of continuous addition of chloride ions is not accompanied by any significant adverse result. The high efficiency of production of chlorine dioxide from chlorate ions enjoyed by the process of U.S. Pat. No. 4,081,520 is maintained, along with an acceptable rate of chlorine dioxide production. The addition of the chloride ions to the reaction medium results in the production of some chlorine along with the chlorine dioxide, but usually such coproduction of chlorine can be tolerated, and often is desirable, in a pulp mill environment.

GENERAL DESCRIPTION OF INVENTION

The operating parameters of the chlorine dioxide generation process may vary over a wide range. Concentrations of reactants are generally controlled by flow rates of aqueous sodium chlorate solution, sulphuric acid and methanol to the reaction zone, which typically takes the form of a unilocular single vessel generator-evaporator-crystallizer.

The total acid normality of sulphuric acid in the reaction medium is maintained at at least 9 normal and may vary up to about 12 normal. The efficiency of conversion of chlorate ions to chlorine dioxide tends to decrease with decreasing total acid normalities. It is preferred to employ a total acid normality of sulphuric acid in the range of about 9 to about 10 normal. Sulphuric acid generally is fed to the reaction medium in the form of concentrated (93%) sulphuric acid.

The concentration of sodium chlorate in the reaction medium usually varies from about 0.2 to about 1.5 molar, preferably about 0.9 to about 1.1 molar. Sodium chlorate is fed to the reaction medium in the form of an aqueous solution thereof, usually having a concentration of about 5 to about 7 molar.

As mentioned above, under normal operating conditions, chloride ions are present in the reaction medium as a result of in situ reduction of chlorine by the methanol. When sodium chloride is continuously fed to the reaction medium in accordance with this invention, the concentration of chloride ions present in the reaction medium is not significantly greater than in the absence of such added sodium chloride, since the added chloride ions are converted to chlorine in the reaction zone. Usually, the chloride ion concentration in the reaction medium varies from about 0.002 to about 0.3 molar.

The chloride ions are added to the reaction medium in the form of an aqueous sodium chloride solution, usually having a concentration of about 5 molar. The sodium chloride may be added as part of the sodium chlorate solution. Hydrochloric acid or hydrogen chloride also may be used to provide the chloride ions to the reaction medium.

The methanol may be fed to the reaction medium in the form of 100% methanol or as an aqueous solution of methanol containing greater than 1% by weight of methanol, although at least about 30% by weight is preferred to avoid excessive water feed to the process.

The reaction temperature usually varies from about 60° to about 90° C., preferably about 70° to about 75° C. Higher temperatures generally lead to faster reaction and hence production rates, but decomposition of chlorine dioxide at excessively high temperatures decreases the yield of chlorine dioxide.

The chlorine dioxide which is present in the gaseous stream produced from the reaction medium in the chlorine dioxide generator is formed into an aqueous solution of chlorine dioxide for use as a bleaching agent, usually by an initial cooling of the gaseous stream to condense a substantial proportion of the steam and a subsequent contact with a water stream in sufficient volume to dissolve all the chlorine dioxide. In the two-stage condensation and dissolution operation, the initial condensation may be effected by cooling to a temperature of about 3° to about 60° C., preferably about 7° to about 60° C. while the subsequent dissolution may be effected by contact of the cooled gas stream from the condensation step with water having a temperature of about 0° to about 22° C., preferably about 3° to about 10° C. Depending on the flow rate of water relative to chlorine dioxide production and the temperatures of condensation and dissolution water, a chlorine dioxide solution is formed having a chlorine dioxide concentration ranging from about 6 to about 20 grams per liter, preferably about 10 to about 15 grams per liter.

As noted above, in the present invention sodium chloride is continuously fed to the reaction medium to result in formation of chlorine along with the chlorine dioxide. This chlorine is dissolved in the chlorine dioxide solution and is present in an amount from about 0.1 to about 2.0 grams per liter, preferably about 0.1 to about 0.5 grams per liter.

The quantity of sodium chloride or other source of chloride ion, such as, hydrochloric acid, which is added to the reaction medium should not exceed that quantity which coproduces chlorine with the chlorine dioxide beyond the solubility limit of chlorine in the chlorine dioxide solution.

The sodium acid sulphate, which is deposited from the reaction medium, usually is in the form of sodium bisulphate ($NaHSO_4$) or sodium sesquisulphate ($Na_3H(SO_4)_2$). The acid values of this sodium acid sulphate may be recovered therefrom by converting the acid sulphate to neutral sodium sulphate by treatment with water and methanol, as described in U.S. Pat. No. 4,325,934, assigned to the assignee hereof, with the sulphuric acid recovered thereby being recycled to the reaction zone. Alternatively, the sodium acid sulphate may be added to the reaction medium of another chlorine dioxide producing process in which sodium chlorate and sodium chloride and/or hydrogen chloride are reacted in an acid aqueous medium at a total acid normality of less than about 4.8 normal, the sodium acid sulphate being used to provide all or part of the acid requirement of such process, as described in U.S. Pat. No. 3,789,108, assigned to the assignee hereof.

Chlorine dioxide is known to be spontaneously explosive at high partial pressures. In the process of U.S. Pat. No. 4,081,520, chlorine dioxide is diluted with steam generated by the boiling of the reaction medium and this steam, combined with a low pressure of operation, typically around 100 mm Hg, maintains the chlorine dioxide below explosive concentrations. At these low pressures, the concentration of chlorine dioxide at the base of the absorption tower wherein the chlorine dioxide is dissolved in water to form the aqueous chlorine dioxide solution, following condensation of the bulk of the steam, remains at a safe level.

The process, however, may be operated at higher but still subatmospheric pressures by introducing sufficient purge air to maintain the partial pressure of chlorine dioxide below about 90 mm Hg. The actual pressure of operation will depend largely on the temperature of the reaction medium, but may vary widely from about 60 to about 400 mm Hg, preferably about 90 to about 190 mm Hg. The ability to modify the pressure of operation by the utilization of a controlled amount of purge air is advantageous in situations where a chlorine dioxide generating plant designed to use the higher subatmospheric pressure, such as when large quantities of chlorine are coproduced with the chlorine dioxide, is used to effect chlorine dioxide formation by reduction of sodium chlorate with methanol.

EXAMPLE

A 15 tons per day capacity chlorine dioxide generator was run wherein acid sodium chlorate solution was reduced with methanol while the reaction medium was boiled under a subatmospheric pressure. Sodium chlorate was continuously fed to the reaction medium as a 5M aqueous solution formed from crystal sodium chlorate at a flow rate of 9.2 USGPM sufficient to maintain a chlorate concentration of 1M in the reaction medium. Sulphuric acid was also continuously fed to the reaction medium as 93% $H_2SO_4$ at a flow rate of 2.0 USGPM sufficient to maintain an acidity of reaction medium of about 9 to 10N. Methanol was continuously fed to the reaction medium as a 50% w/w aqueous solution at a flow rate of 0.8 USGPM. The average temperature for the generator liquor was about 80° C. and sodium sesquisulphate crystals were removed from the generator.

The generator was run under substantially steady state conditions to produce chlorine dioxide, first in the absence of deliberately added sodium chloride and subsequently with the continuous addition of 0.5 USGPM of 5M sodium chloride solution. Offgases from the generator were cooled to a temperature of 30° C. to condense the steam and the cooled gases were dissolved in water in an absorption tower using water having a temperature of 10° C. The chemical efficiency of conversion of chlorate ions to chlorine dioxide was determined in each case.

A chemical efficiency of about 96% was observed both for the run when deliberately added sodium chloride was omitted and for the run when sodium chloride was deliberately added. During the period of time that sodium chloride was deliberately added, the chlorine dioxide solution obtained contained about 10 gpl chlorine dioxide and about 0.7 to 0.8 gpl chlorine, while during the initial run when sodium chloride addition was not effected, the chlorine dioxide solution contained about 10 gpl chlorine dioxide and about 0.5 to 0.6 gpl chlorine. In addition, an increase in production rate of chlorine dioxide production was observed during the period when sodium chloride was deliberately added to the reaction medium.

SUMMARY OF DISCLOSURE

In summary of this disclosure, the present invention relates to improvements in the operability of highly efficient chlorine dioxide processes without adversely affecting that efficiency. Modifications are possible within the scope of the invention.

What I claim is:

1. In a continuous process for the production of chlorine dioxide by reducing sodium chlorate with methanol in an aqueous acid reaction medium and which exhibits periodic random loss of production, wherein:

aqueous sodium chlorate solution and sulphuric acid are continuously fed to a boiling aqueous acid reaction medium in a reaction zone maintained under a subatmospheric pressure and having a total acid normality of at least 9 normal, methanol is continuously fed to the reaction medium in sufficient quantity to form chlorine dioxide from the reaction medium, chlorine dioxide is continuously removed from the reaction zone in gaseous admixture with steam and dissolved in water to form an aqueous solution thereof, and sodium acid sulphate is continuously deposited from the aqueous reaction medium in the reaction zone, the improvement wherein chloride ions are also continuously fed to the reaction medium in said reaction zone in an amount at least sufficient to prevent said random periodic loss of production and no more than that which results in chlorine being present in said gaseous admixture in an amount which permits dissolution of the chlorine in the aqueous chlorine dioxide solution.

2. The process of claim 1 wherein said aqueous chlorine dioxide solution is formed by initially cooling the gaseous admixture to condense a substantial proportion of the steam therein and subsequently contacting the cooled gaseous admixture with sufficient water to dissolve the chlorine dioxide and chlorine.

3. The process of claim 2 wherein the gaseous admixture is cooled to a temperature of about 3° to about 60° C. and the water contacting the cooled gaseous admixture has a temperature of about 0° to about 22° C.

4. The process of claim 3 wherein the temperature to which the gaseous admixture is cooled is about 7° to about 60° C. and the temperature of the water is about 3° to about 10° C.

5. The process of claim 1 wherein said reaction zone is maintained at a subatmospheric pressure of about 60 to about 400 mm Hg at the boiling point of the reaction medium, and sufficient purge air is introduced to the reaction zone to maintain the partial pressure of chlorine dioxide in the gaseous admixture is less than about 90 mm Hg.

6. The process of claim 5 wherein said subatmospheric pressure is about 90 to about 190 mm Hg.

7. A continuous process for the production of chlorine dioxide, which comprises:
   continuously feeding an aqueous sodium chlorate solution to a reaction zone containing an aqueous acid chlorine dioxide-generating reaction medium to provide a concentration of sodium chlorate in the reaction medium of about 0.2 to about 1.5 molar,
   continuously feeding sulphuric acid to said reaction medium to provide a total acid normality of 9 to about 12 normal in said reaction medium,
   continuously feeding methanol to said reaction medium in sufficient quantity to effect formation of chlorine dioxide from said reaction medium at high efficiency,
   continuously feeding an aqueous solution of chloride ions to said reaction medium to maintain a concentration of chloride ions in the reaction medium of about 0.002 to about 0.3 molar, to eliminate the incidence of periodic random loss of production otherwise present in the absence of said added chloride ions,
   continuously maintaining said reaction medium at its boiling point at a temperature in the range of about 60° to about 90° C. while a subatmospheric pressure of about 60 to about 400 mm Hg is applied to the reaction zone and the partial pressure of chlorine dioxide is maintained below about 90 mm Hg,
   continuously withdrawing a gaseous mixture of chlorine dioxide, chlorine and steam from said reaction zone, and
   continuously depositing a sodium acid sulphate from said reaction medium after the reaction medium becomes saturated thereby after the initial start up of the process.

8. The process of claim 7, wherein the sodium chlorate concentration of the reaction medium is about 0.9 to about 1.1 molar, the total acid normality of sulphuric acid in the reaction medium is about 9 to about 10 normal, the reaction temperature is about 70° to about 75° C. and the subatmospheric pressure is about 90 to about 190 mm Hg.

9. The process of claim 7 including forming an aqueous solution of all the chlorine dioxide and chlorine contained in said gaseous mixture.

10. The process of claim 9 wherein said aqueous solution is formed by cooling said gaseous mixture to a temperature of about 3° to about 60° C. to cause condensation of a substantial proportion of the steam therein and contacting the cooled stream with water having a temperature of 0° to about 22° C. to dissolve all the chlorine dioxide and chlorine and form an aqueous solution containing about 6 to about 20 grams per liter of chlorine dioxide and about 0.1 to about 2.0 grams per liter of chlorine.

11. The process of claim 10, wherein the gaseous mixture is cooled to a temperature of about 7° to about 60° C., the cooled gas stream is contacted with water having a temperature of about 3° to about 10° C., and the aqueous solution contains about 10 to about 15 grams per liter of chlorine dioxide and about 0.1 to about 0.5 grams per liter of chlorine.

12. The process of claim 7 wherein the aqueous sodium chlorate solution is fed to the reaction medium as an aqueous solution having a concentration of about 5 to about 7 molar sodium chlorate.

13. The process of claim 12 wherein the aqueous solution of chloride ions is fed to the reaction medium as an aqueous sodium chloride solution having a concentration of about 5 molar.

* * * * *